United States Patent [19]

Veldhuis et al.

[11] Patent Number: 5,453,968
[45] Date of Patent: Sep. 26, 1995

[54] METHODS OF AND INFORMATION RECORDING DEVICES FOR RECORDING AND/OR INHIBITING RECORDING OF AN INFORMATION SIGNAL HAVING COPY BITS WITH LOGIC VALUES WHICH ALTERNATE IN ACCORDANCE WITH A PATTERN

[75] Inventors: Hindrik Veldhuis; Rudolf Roth; Jacobus P. J. Heemskerk, all of Eindhoven, Netherlands

[73] Assignee: U.S. Philips Corporation, New York, N.Y.

[21] Appl. No.: 291,328

[22] Filed: Aug. 16, 1994

Related U.S. Application Data

[63] Continuation of Ser. No. 41,142, Mar. 31, 1993, abandoned, which is a continuation of Ser. No. 581,832, Sep. 12, 1990, abandoned.

[30] Foreign Application Priority Data

Sep. 21, 1989 [NL] Netherlands .............................. 8902358

[51] Int. Cl.⁶ .................................. G11B 5/09; G11B 3/64
[52] U.S. Cl. .................................. 369/84; 369/48; 369/53; 360/60; 380/4
[58] Field of Search .......................... 360/40, 60; 369/47, 369/48, 59, 83, 84; 380/3, 4, 15, 23

[56] References Cited

U.S. PATENT DOCUMENTS

| | | | |
|---|---|---|---|
| 4,528,588 | 7/1985 | Löfberg | 369/84 |
| 4,682,317 | 7/1987 | Tomisawa | 369/59 |
| 4,775,901 | 10/1988 | Nakano | 360/60 |
| 4,849,836 | 7/1989 | Kachikian | 360/60 |
| 5,231,546 | 7/1993 | Shimada et al. | 360/60 |

OTHER PUBLICATIONS

CEI-IEC 958 International Electrotechnical Commission, "Digital Audio Interface", pp. 3-49.

*Primary Examiner*—Georgia Y. Epps
*Assistant Examiner*—P. W. Huber
*Attorney, Agent, or Firm*—Richard A. Weiss

[57] ABSTRACT

Methods of and information recording devices for recording and/or inhibiting recording of a signal including copy bits on a record carrier, and a record carrier including that signal. The signal has successive information frames including main data and subcode data. The subcode data of the information frames make up successive subcode frames having copy bits with logic values which alternate among the subcode frames in accordance with a predetermined pattern. Each subcode frame has at least one copy bit. In one of the embodiments, the signal is received and a determination is made whether to inhibit its recording on the basis of the predetermined pattern exhibited by the logic values of the copy bits contained in the subcode frames. In another embodiment the subcode frames are replaced by substitute subcode frames having copy bits with logic values which alternate among the substitute subcode frames in accordance with a selected pattern prior to recording of the signal. The predetermined and selected patterns are indicative of a particular characteristic of the main data (e.g., whether the main data is copy protected).

34 Claims, 4 Drawing Sheets

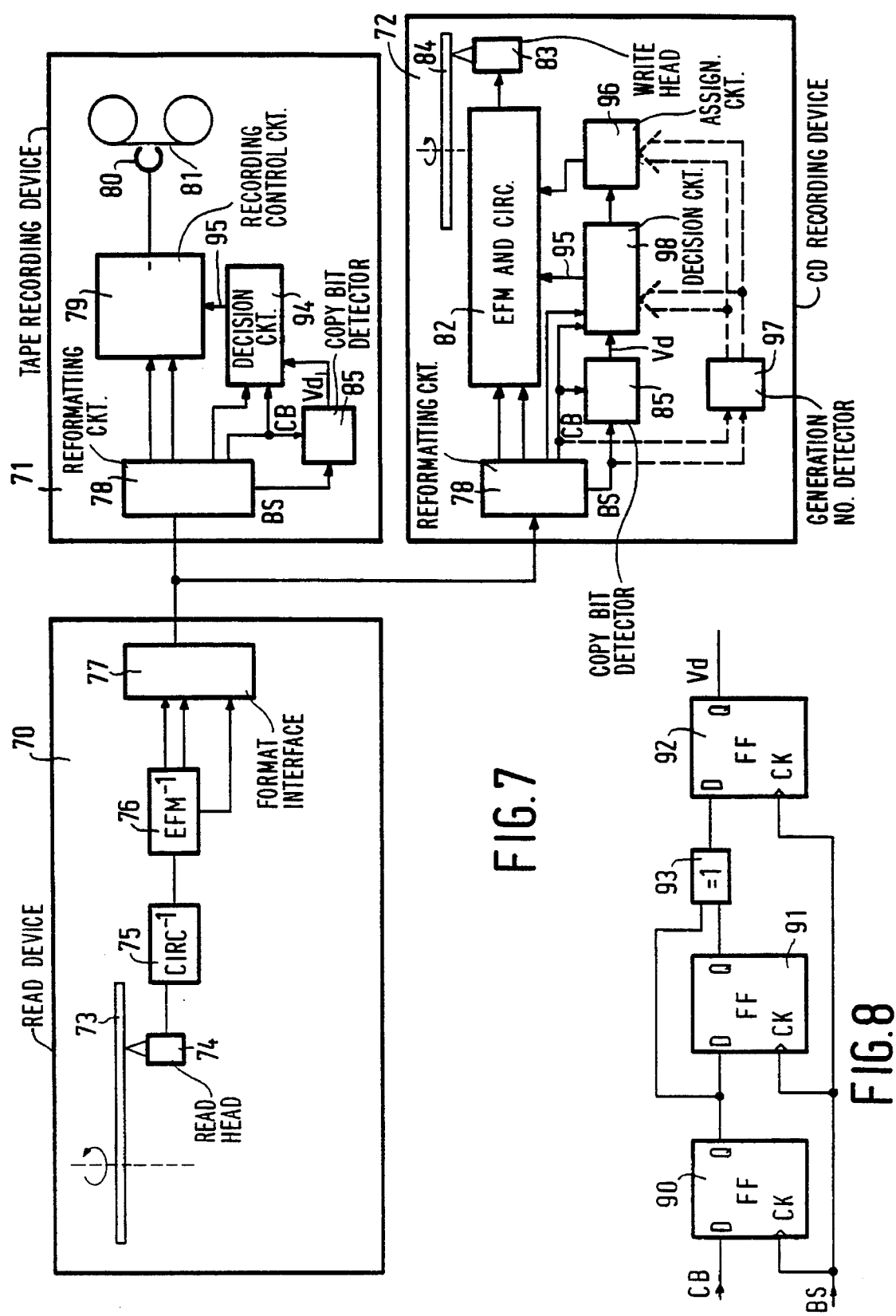

METHODS OF AND INFORMATION RECORDING DEVICES FOR RECORDING AND/OR INHIBITING RECORDING OF AN INFORMATION SIGNAL HAVING COPY BITS WITH LOGIC VALUES WHICH ALTERNATE IN ACCORDANCE WITH A PATTERN

This is a continuation of application Ser. No. 08/041,142, filed Mar. 31, 1993, which was a continuation of 07/581,832, filed Sep. 12, 1990, now both abandoned.

BACKGROUND OF THE INVENTION

1. Field of the Invention

The invention relates to a record carrier carrying main information thereon together with a series of subcode frames which each comprise a "copy" bit. The invention further relates to a method of producing a record carrier carrying main information thereon, together with a series of subcode frames while each comprise a "copy" bit, and to an information recording device for recording the main information on the record carrier together with the series of subcode frames which each comprise a "copy" bit. Finally, the invention relates to an information recording device which comprises an anti-copy sub-device to inhibit unauthorized copying of information received thereby, which anti-copy sub-device comprises a decision circuit for deciding whether recording of the received information is permissible depending upon the logic values of the received "copy" bits, and a control circuit to inhibit recording in response to a decision that recording is not permissible.

2. Description of the Related Art

Record carriers which carry digitized audio information have been available for a considerable time. Such a record carrier may be, for example, an optically readable disc, such as a "Compact Disc" or a magnetic tape, such as "DAT" cassette tapes. The advantage of digitized audio information is the extremely high quality of the recording. Another property of digitized information is that it can be copied to an almost unlimited extent without any significant loss of quality.

This last-mentioned property constitutes a substantial problem when consumer equipment in which digital audio information cannot only be reproduced from a record carrier but can also be re-recorded on another record carrier is marketed. This is because such equipment makes possible large scale copyright infringement by a customer thereof because the contents of a record carrier carrying copyrighted digitized audio information can easily be copied. Since there is no loss of quality as a result of copying, there is hardly any reason for the consumer to purchase a comparatively expensive original which is subject to copyright if the original or a copy thereof is available. All of this leads to a substantial loss of copyright revenues.

A recent copy protection method which mitigates the above drawbacks is known as the "Solocopy" copy-protection system. This method allows only first-generation copies to be made of record carriers carrying original information. In the "Solocopy" copy-protection system, it is assumed that the digital information to be recorded complies with a standard audio interface format, as described in, for example, the first edition (1989.03) of the IEC-958 standard. Such a format comprises main information channels and subcode information channels. The subcode information signal includes a "copy" bit indicating whether the information may be copied freely, and a category code indicating the source of the recorded information.

In accordance with the "Solocopy" copy protection method, it is ascertained by means of the category code and the "copy" bit whether the applied information may be copied. For example, copying is always allowed if the category code indicates that the information originates from a CD player. This is based on the assumption that a CD player is only capable of playing CDs of the read-only type. However, more recently, recording devices have been developed by means of which information can be recorded on a CD record carrier, which information can subsequently be read therefrom by a standard CD player for reading CDs of the read-only type.

Therefore, the prior-art "Solocopy" copy-protection method does not inhibit copying of CD information recorded on an inscribable optical record carrier. It is an object of the invention to provide means which mitigate this drawback.

SUMMARY OF THE INVENTION

In accordance with a first aspect of the invention, a record carrier of the type defined in the opening paragraph is characterized in that "copy" bits of consecutive subcode frames have logic values which alternate in an alternation pattern.

A method for producing such a record carrier is characterized in that during recording, logic values are assigned to "copy" bits of consecutive sub-code frames so as to provide those "copy" bits with logic values which alternate in an alternation pattern.

A recording device for recording a record carrier in accordance with the invention is characterized in that the device comprises an assignment circuit for assigning logic values to "copy" bits of consecutive subcode frames of information to be recorded so as to provide those "copy" bits with logic values which alternate in an alternating pattern.

Recording "copy" bits with alternating logic values falls within the scope of the standard Compact Disc Digital Audio system, so that it remains possible for such record carriers to be read by existing CD players. When standard CD information is recorded on an inscribable record carrier, this makes it possible to indicate by means of an alternating logic value of a "copy" bit in the recorded information that the information recorded on the relevant record carrier is a copy, but without thereby adversely affecting reading of the information by a standard CD player.

The use of alternation patterns of different forms enables the generation number of a copy in the copying cycle to be specified. For example, in the case that a copy-protection method allows both first and second generation copies to be made, it is possible to distinguish between first-generation, second generation and higher-generation copies.

Alternation patterns which are very suitable because of their simplicity and which enable the generation number to be specified are periodic patterns in which the generation number is represented by the duty cycle of the pattern, i.e., the ratio between the number of "copy" bits of a first logic value in a period of the pattern and the total number of "copy" bits in that period.

In accordance with a second aspect of the invention, copying of a record carrier can be inhibited in a very simple manner by the information recording device for recording the main information, which is received together with a series of subcode frames which each comprise a "copy" bit.

Such a device comprises an anti-copy sub-device for inhibiting unauthorized copying of the received information. The anti-copy sub-device comprises a decision circuit for deciding whether recording of the received information is allowed depending on logic values of received copy bits and an inhibitor circuit responsive to a decision that recording is not allowed to inhibit recording, characterized in that the sub-device comprises a detection circuit for detecting an alternation pattern in the logic values of the received "copy" bits, the decision circuit being adapted to decide whether recording is allowed depending upon detection of the alternation pattern.

This device has the advantage that the information to be recorded can be transmitted directly in the format prescribed by the digital audio interface standard IEC-958, without additional steps being required during information reading. Indeed, in conformity with this standard, the logic value of a "copy" bit in the subcode for the digital audio interface standard is equalized to a "copy" bit of the source of the information, i.e., in the present case the "copy" bit of the information read from the record carrier by the read device.

By detecting the various alternation patterns, it is again possible to make the decision whether or not recording is permitted by distinguishing between first and higher-generation copies.

The recording device may comprise an anti-copy sub-device constructed to make recordings on a record carrier of another type, for example, a DAT cassette tape, than that from which the information originates, for example, an inscribable CD.

If the recording device is intended for recording information on a record carrier of the same type as that from which the information with alternating logic values of "copy" bits originates, it is desirable to provide this recording device with an assignment circuit which causes "copy" bits with alternating logic values to be recorded.

BRIEF DESCRIPTION OF THE DRAWINGS

The invention and further advantages thereof will now be described in more detail with reference to FIGS. 1 to 9, in which

FIG. 7 shows an information copying system employing information recording devices in accordance with the invention;

FIG. 8 shows in detail a detection circuit for use in the information recording devices shown in FIG. 7.

DESCRIPTION OF THE PREFERRED EMBODIMENTS

Figure 1:
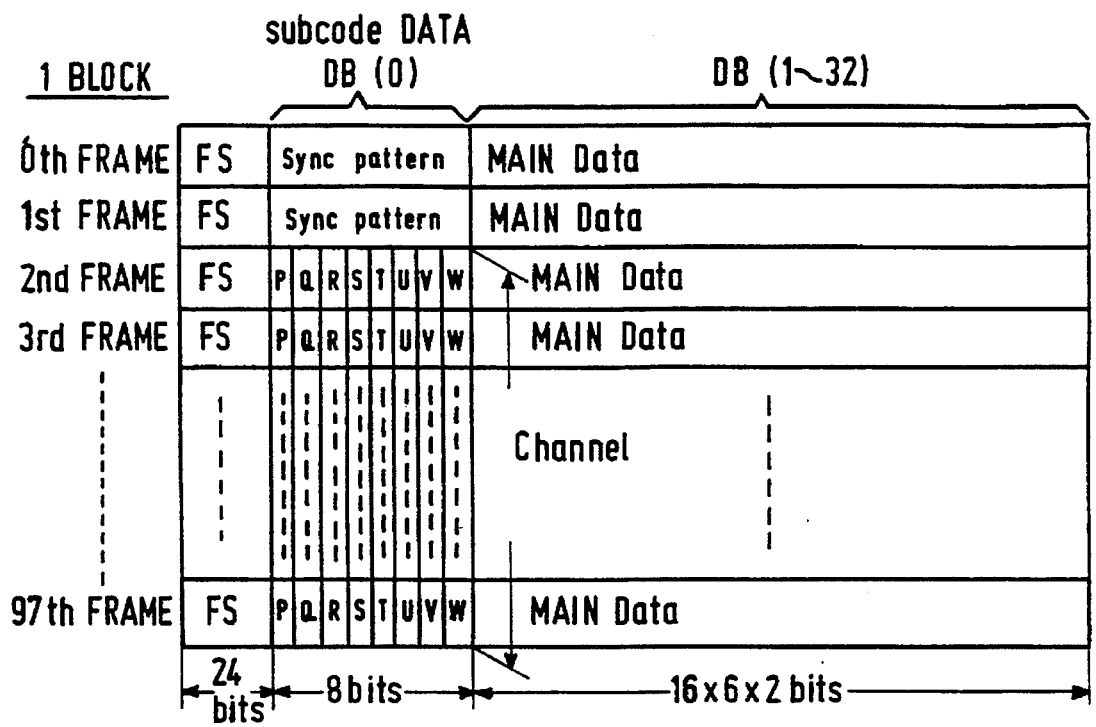
FIGS. 1 and 2 represent the format of a standard CD signal.

FIG. 1 illustrates the data format of a digital signal in conformity with the CD standard. Such a signal is divided into blocks (Block) of 98 FRAMES each. Each FRAME comprises data bits (DB) representing the main information (MAIN DATA) and subcode information (subcode DATA). The subcode information of FRAME 2 through FRAME 97 comprises eight subcode bits for each FRAME. The subcode bits within a block constitute subcode frames of the P-W-subcode channels; each subcode frame comprising 96 subcode bits.

Figure 2:
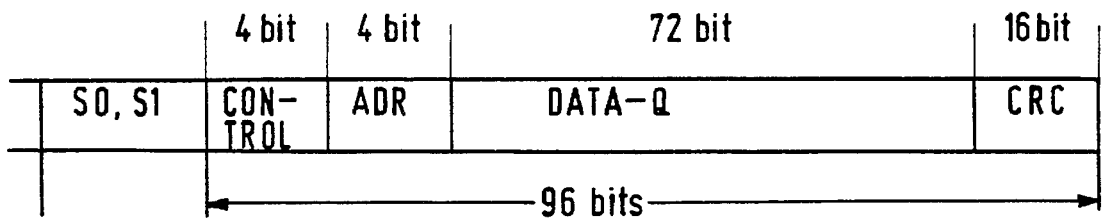

FIG. 2 illustrates the format of the subcode frame of the subcode Q channel. This subcode frame comprises a 4-bit "control" group, including one bit referred to as the "copy" bit. The logic value of the "copy" bit indicates whether the associated main information may be copied freely. For the well known Compact Disc, the logic values of the "copy" bits are the same throughout the disc, which means that in every subcode frame on the Compact Disc the copy bit either has the logic value "1" or the logic value "0".

Figure 3:
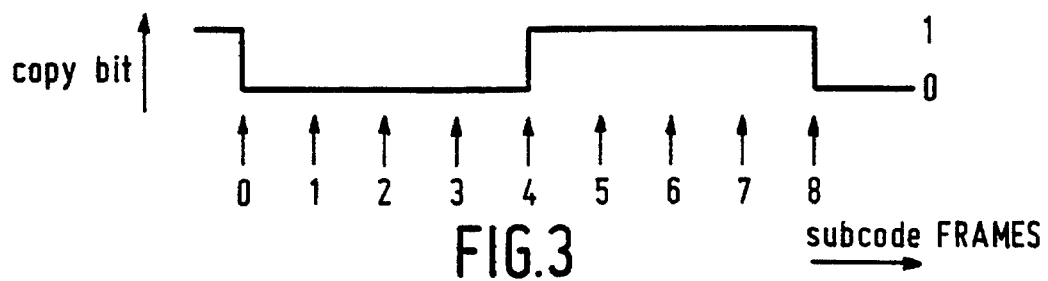
FIGS. 3 and 4 show possible forms of the alternating pattern of the logic values of the "copy" bits for a record carrier in accordance with the invention.
Figure 4:
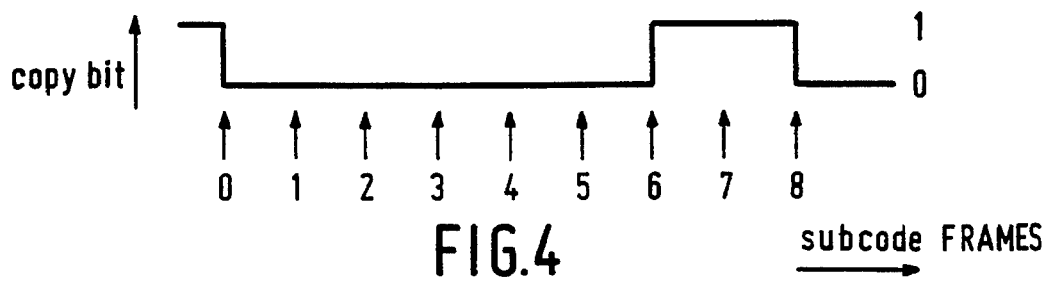

In the case of a record carrier in accordance with the invention, the logic values of the "copy" bits alternate, for example, as illustrated in FIG. 3 and FIG. 4, in order to indicate that the recorded information is a copy. In the case of the alternation pattern shown in FIG. 3, the values of the copy bits alternate periodically, 4 subcode frames each comprising a "copy" bit of the logic value "0" each time alternating with 4 subcode frames each comprising a "copy" bit of the logic value "1". In FIG. 4, the logic values of the copy bits also vary periodically, but here 6 subcode frames comprising copy bits of the logic value "0" each time alternate with 2 subcode frames comprising copy bits of the logic value "1". Recording different alternation patterns of different forms, as illustrated in FIGS. 3 and 4, also provides the possibility of indicating on the record carrier whether the copy is a first-generation copy, or a second or higher-generation copy. In the alternation patterns illustrated in FIGS. 3 and 4, the duty cycle differs. The duty cycle being the ratio between the number of "copy" bits of the logic value "0" in a period and the total number of bits in each period of the alternation pattern.

It will be evident to those skilled in the art that the alternation patterns can also specify the generation number of a copy in a copying cycle in a different manner, for example, by periodic alternation patterns of different period lengths. By means of a suitable d.c. free coding of the logic values of the "copy" bits, it is also possible to transmit information about the generation number and, if desired, other information via the "copy" bit.

Transmitting information via alternating logic values of the "copy" bits has the advantage that this remains within the scope of the CD standard. This means that the information can be read by means of a standard CD player.

Figure 5:
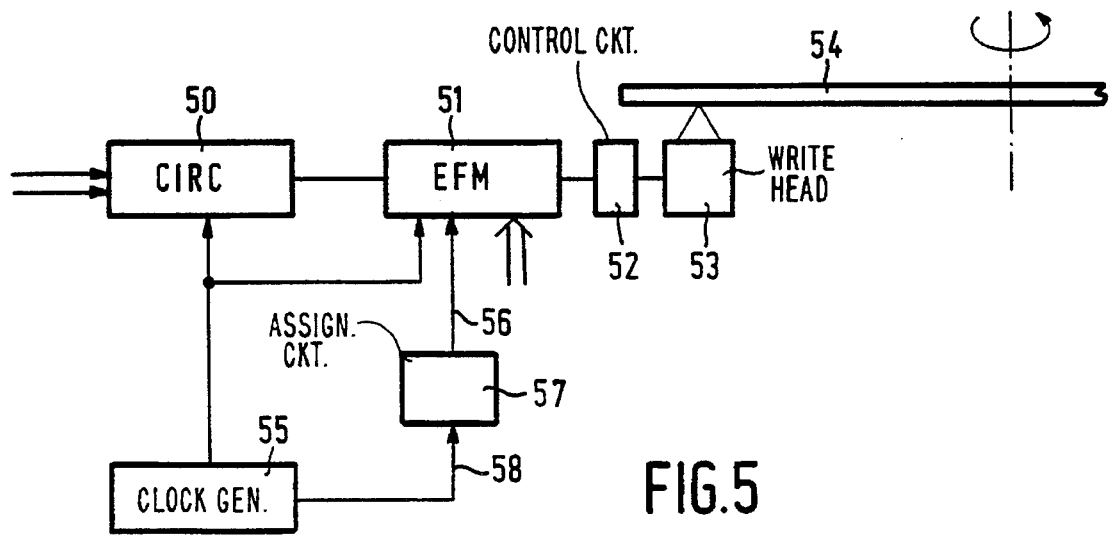
FIG. 5 shows an information recording device in accordance with the invention.

FIG. 5 shows an embodiment of a recording device for producing a record carrier on which the logic values of the "copy" bits alternate. The recording device comprises a cascade arrangement of a CIRC encoder 50 and an EFM modulator 51 for converting the applied digital information, originating from, for example, analog-to-digital converters, into a format prescribed by the CD standard. The EFM modulator 51 supplies an output signal of this format to a control circuit 52 for an optical write head 53 arranged opposite a rotating optical record carrier 54 of an inscribable type. The recording device further comprises a clock signal generation circuit 55 for generating clock signals for controlling the CIRC encoder 50 and the EFM modulator 51. The EFM modulator further comprises inputs for receiving the subcode information to be recorded with the main information and generating therefrom the digital signal for recording on the record carrier, including the "copy" bits. The logic values of the "copy" bits to be recorded are supplied to the EFM modulator 51 by an assignment circuit 57 via a signal line 56. The assignment circuit 57 supplies a periodic signal to the EFM modulator. This periodic signal can be derived, for example, by frequency division, from a clock signal which is applied to the assignment circuit 57 by the clock signal generation circuit 55 via a signal line 58.

Figure 6:
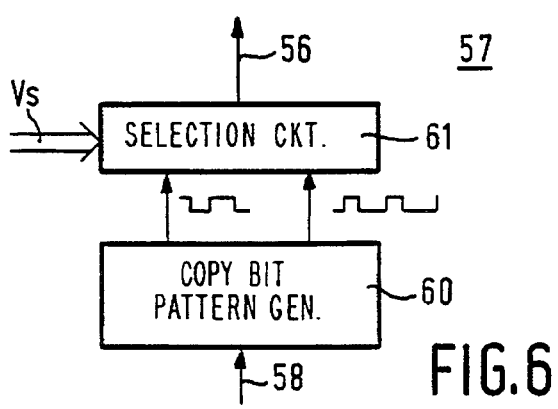
FIG. 6 shows in detail an assignment circuit for use in the information recording device shown in FIG. 5.

FIG. 6 shows an embodiment of the assignment circuit 57 enabling an alternation pattern of a specific form to be selected from a plurality of alternation patterns of different forms. For this purpose, the assignment circuit 57 comprises a copy bit pattern generator circuit 60 which produces a plurality of signals having alternating patterns of different forms, for example, alternating patterns having different "duty cycles", from the clock signal applied via the signal line 58. These signals are applied to a selection circuit 61 which selects one of the applied signals and supplies it to the signal line 56 depending on a control signal Vs.

Since alternating logic values of the "copy" bits in the information on the record carrier in accordance with the invention indicate that the recorded information is a copy, further copying can be inhibited simply by detecting whether the logic values of the copy bits in the information supplied for recording alternate and inhibiting recording if such alternating logic values are detected. FIG. 7 shows an embodiment of an information copying system in which this is realized. This information copying system comprises an optical read device 70 for reading optical discs, a magnetic recording device 71 (e.g., a tape recording device), and an optical recording device 72 (e.g. a CD recording device) for recording information read by the read device 70.

The read device 70 is of a customary type adapted to read CD information from an optical record carrier 73. For this purpose, the read device 70 comprises an optical read head 74 which is coupled to a cascade arrangement of a customary CIRC decoding circuit 75 and an EFM demodulator 76, which, for example, form part of an integrated circuit of the type SAA 7210 marketed by PHILIPS. Such an EFM demodulator 76 produces two digitized stereo audio information signals and a subcode signal at its outputs. These signals are applied to a formatting circuit 77, for example, of the type SAA 7220, which converts the received information into a format prescribed by a digital audio interface standard (IEC 950). This digital audio interface format comprises blocks of 192 main information frames, and a plurality of interface subcode frames. These subcode frames each comprise an interface "copy" bit whose logic value, in accordance with the digital audio interface standard, is set in accordance with the "copy" bit in the subcode information of the information being read.

An output signal complying with the digital audio interface standard is applied to reformatting circuits 78 of the recording devices 71 and 72. The reformatting circuits 78 convert the received information into a format suitable for processing by the recording devices 71 and 72.

The reformatting circuits may be constituted, for example, by an integrated circuit of the type SX 23053 marketed by SONY. This type of reformatting circuit produces the main information and the subcode information on its outputs. The circuit further comprises an output at which "copy"-bit information CB relating to the logic value of the received interface "copy" bit is produced and an output at which a block synchronization signal BS is produced to indicate the beginning of each digital audio interface block received.

In the magnetic recording device 71, the information supplied by the reformatting circuit 78 is applied to a recording control circuit 79 of a customary type for driving a magnetic-head system 80 for recording the received information on a DAT cassette tape 81. Similarly, the information supplied by the reformatting circuit 78 in the optical recording device 72 is applied to a circuit 82 of a customary type, which comprises, for example, an EFM modulator and CIRC encoder to drive an optical write head 83 for recording the received information on an optical record carrier 84. In the recording devices 71 and 72, the "copy"-bit information CB and the block synchronization signals BS supplied by the reformatting circuit 78 are applied to a detection circuit 85, for detecting whether the logic value of the received "copy"-bit information alternates. The detection circuit 85 supplies a detection signal Vd if the alternating logic value of the "copy"-bit information is detected.

FIG. 8 shows an example of detection circuit 85 comprising three clocked D flip-flops 90, 91 and 92. The block synchronization signal BS supplied by the reformatting circuit is applied to the clock inputs of the flip-flops 90, 91 and 92. The interface "copy"-bit information CB is applied to the data input of the flip-flop 90. The output of the flip-flop 90 is connected to the data input of the flip-flop 91 and to an input of an Exclusive-OR gate 93. Another input of the Exclusive-OR gate 93 is connected to the output of the flip-flop 91. The output of the Exclusive-Or gate 93 is connected to the data input of the flip-flop 92. The output signal on the output of the flip-flop 92 serves as the detection signal Vd. The circuit shown in FIG. 8 operates as follows. If the logic value of the interface "copy" bit changes, the logic value of the signal on the input of the flip-flop 91 at the instant at which the first "copy" bit of changed logic value reaches the input of the flip-flop 91 will no longer correspond to the logic value of the signal on the output of the flip-flop 91. In that case the logic value of the output of the Exclusive-OR gate becomes a logic "1" value. This value is latched in the flip-flop 92, after which the detection signal Vd also assumes the logic "1" value.

In the recording device 71, both the detection signal Vd and the subcode information supplied by the reformatting circuit 78 are applied to the decision circuit 94. On the basis of the received subcode information and the detection signal Vd, the decision circuit 94 decides whether recording of the received main information is allowed. If recording is not allowed, the decision circuit 94 generates a control signal which is applied to the control signal 79 via the signal line 95, the control circuit 79 being of a type which is disabled in response to the control signal applied via the signal line, so that recording of information is inhibited.

The decision circuit 94 may comprise, for example, a microcomputer loaded with a suitable program. Before this program is described in detail, that part of the received subcode information of the digital audio interface format which is important for a correct understanding of the decision criteria will be described. In particular, the subcode C-channel of the digital audio interface format of the received subcode information is of interest. This subcode C-channel comprises subcode frames of 192 bits. These subcode frames indicate whether the information stems from a source intended for professional use. In addition, it indicates whether the associated information stems from an audio source. Moreover, for sources intended for consumer applications the subcode C-channel contains a category code indicating the type of source. This may be, for example, a 2-channel Compact Disc audio system, a 2-channel digital audio type player, etc.

Figure 9:
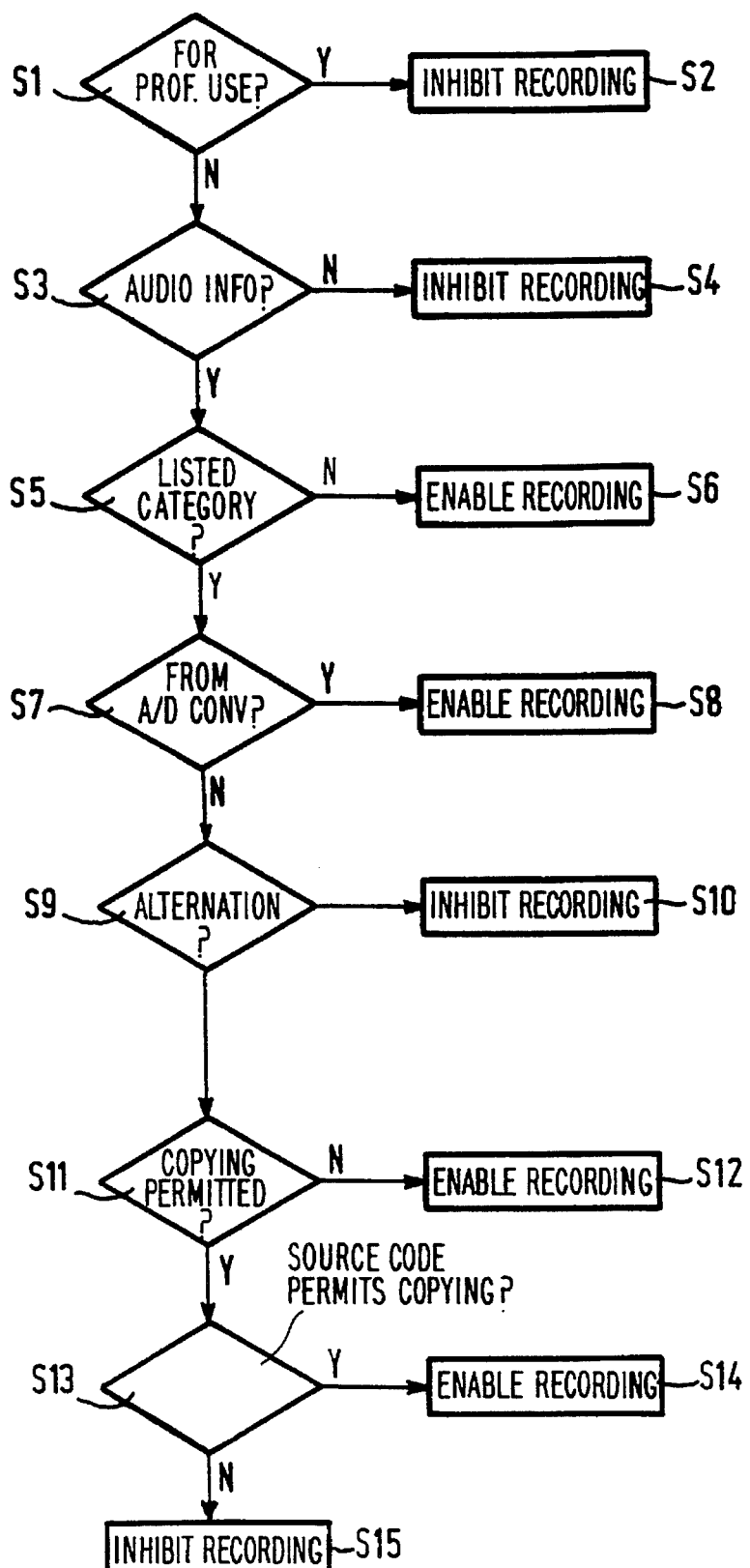
FIG. 9 is a flow chart of a program for determining whether recording of the received information is allowed.

FIG. 9 is a flow chart of a decision program for determining whether recording of the received information is allowed. This decision program is based on the decision program employed in the "Solocopy" system. However, the program has been adapted to make the decision dependent upon the detection of alternating logic values of the "copy" bits.

In Step S1 of the program, it is ascertained by means of the information from the subcode C-channel whether the information originates from an information source intended for professional uses. If this is the case, recording is inhibited in step S2. In step S3, it is checked whether the received information is audio information. If this is not the case, recording is inhibited in step S4. In step S5, it is checked whether the received category code occurs in the list of known category codes. If this is not the case, recording is enabled in step S6 and, in addition, information is recorded on the tape 81 to indicate that the recorded information is a copy. If the information is read subsequently, a category code is assigned to the information to denote that recording is not allowed. However, the manner in which this is effected falls beyond the scope of the present invention and is, therefore, not described in detail.

In step S7, it is checked whether the information stems from an analog-to-digital converter. If this is the case, recording is enabled in step S8. In step S9, it is determined on the basis of the received detection signal Vd whether the logic values of the received interface copy bits alternate. If the values alternate, recording is inhibited in step S10. In step S11, it is ascertained on the basis of the received logic values of the copy bits whether the relevant information may be copied freely. If this is the case, recording is enabled in step S12, information being added to indicate that the recorded information may be copied freely.

In step S13, it is checked whether the category code specifies a source for which copying of the supplied information is allowed. If this is the case, recording is enabled in step S14. If it is not the case, recording is inhibited in step S15.

The optional recording device 72 of FIG. 7 comprises a decision circuit 98 which is largely identical to the decision circuit 94. However, in the case in which information is recorded which should not be copied any more, the decision circuit 98 generates a control signal for an assignment circuit 96 which causes "copy" bits of alternating logic values to be recorded. For the assignment circuit 96, the assignment circuit 57 in FIG. 5 described above may be employed.

It is also possible to provide the optical recording device 72 with a detection circuit 97 for detecting the generation number in a copy cycle for the received information on the basis of the form of the alternation pattern. The decision whether the received information may be recorded or not can then be made on the basis of the detected generation number of the information. For example, copying of a first-generation copy may be allowed while copying of a second generation copy is not allowed. The assignment circuit 96 should be adapted so that depending on the detected generation number it generates a signal such that an alternation pattern indicating a higher generation number than the detected generation number is required.

In the foregoing, the invention has been illustrated for a record carrier carrying a standard CD signal having "copy" bits with alternating logic values to indicate that the recorded information is a copy. However, it is to be noted that, in principle, the invention may be applied to any record carrier which in addition to the main information carries subcode information comprising a "copy" bit.

What is claimed is:

1. A method of recording a digital information signal on a record carrier, the signal having successive information frames which each include main data and subcode data, the subcode data of the information frames forming consecutive subcode frames, each subcode frame including the subcode data of a predetermined number of the information frames, the method comprising:

generating the signal such that copy bits are provided in the subcode data of the subcode frames, each subcode frame having at least one copy bit and the copy bits having logic values which alternate among the subcode frames in accordance with a predetermined pattern which is indicative of a particular characteristic of the main data being recorded whereby the copy bits in at least two of the subcode frames have logic values which are different; and recording the information frames.

2. The method as claimed in claim 1, wherein the main data being recorded has previously been recorded, and the pattern is indicative of a generation number signifying the number of times the main data will have been recorded.

3. The method as claimed in claim 2, wherein the pattern is periodic, and the ratio of the number of copy bits of a first logic value in a period of the pattern to the total number of copy bits in the period is indicative of the generation number.

4. The method as claimed in claim 1, wherein the signal is in a standardized format for recording on a Compact Disc.

5. The method as claimed in claim 1, wherein the pattern signifies that the main data is copy protected.

6. An information recording device for recording a digital information signal on a record carrier, the signal having successive information frames which each include main data and subcode data, the subcode data of the information frames forming consecutive subcode frames, each subcode frame including the subcode data of a predetermined number of the information frames, the device comprising:

generating means for generating the signal such that copy bits are provided in the subcode data of the subcode frames, each subcode frame having at least one copy bit; and assignment means, coupled to said generating means, for assigning logic values for the copy bits such that the copy bits have logic values which alternate among the subcode frames in accordance with a selected pattern which is indicative of a particular characteristic of the main data being recorded whereby the copy bits in at least two of the subcode frames have logic values which are different.

7. The device as claimed in claim 6, wherein said assignment means comprises:

pattern generation means for generating logic values for the copy bits in accordance with a plurality of different patterns; and selection means coupled to said pattern generation means for selecting one of the different patterns, depending on the particular characteristic, as the selected pattern.

8. The device as claimed in claim 7, wherein each of the different patterns is periodic, and said selection means is adapted to select one of the different patterns in which the ratio of the number of logic values of a first type in a period of that pattern to the total number of logic values in the period corresponds to a generation number indicative of the number of times the main data being recorded will have been recorded.

9. The device as claimed in claim 6, wherein the signal is in a standardized format for recording on a Compact Disc.

10. The device as claimed in claim 6, wherein the selected pattern signifies that the main data is copy protected.

11. The device as claimed in claim 7, wherein each of the different patterns corresponds to a generation number indicative of the number of times in which the main data being recorded will have been recorded.

12. An information recording device for recording a digital information signal supplied thereto on a record carrier, the signal having successive information frames which each include main data and subcode data, the subcode data of the information frames forming consecutive subcode frames, the device comprising:

decision means for producing a disabling control signal when the subcode frames include copy bits having logic values which alternate among the subcode frames in accordance with a predetermined pattern whereby the copy bits in at least two of the subcode frames have logic values which are different; and inhibiting means, coupled to said decision means, for inhibiting the device from recording the signal when said decision means produces the disabling control signal.

13. The device as claimed in claim 12, wherein said decision means is adapted to produce said disabling control signal when the predetermined pattern indicates that the main data is copy protected.

14. The device as claimed in claim 12 wherein the logic values of the copy bits alternate among the subcode frames in a periodic pattern, and said decision means determine whether the predetermined pattern exists on the basis of the ratio of the number of copy bits of a first logic value in a period of the periodic pattern to the total number of copy bits in the period.

15. The device as claimed in claim 12, further comprising:

replacement means for replacing the subcode frames with substitute subcode frames, each substitute subcode frame having at least one substitute copy bit; and assignment means, coupled to said replacement means, for assigning logic values for the substitute copy bits such that the substitute copy bits have logic values which alternate among the substitute subcode frames in accordance with a selected pattern which is indicative of a particular characteristic of the main data which will be recorded whereby the substitute copy bits in at least two of the substitute subcode frames have logic values which are different.

16. The device as claimed in claim 15, wherein the copy bits in the subcode frames have logic values which alternate among the subcode frames and form an original pattern, and the selected pattern is selected by said assignment means on the basis of the original pattern.

17. The device as claimed in claim 16, wherein the original pattern is periodic, and said assignment means assigns logic values for the substitute copy bits so that the selected pattern is periodic and the ratio of the number of substitute copy bits of a first logic value in a period of the selected pattern to the total number of substitute copy bits in the period of the selected pattern is dependent on the ratio of the number of copy bits of a first logic value in a period of the original pattern to the total number of copy bits in the period of the original pattern.

18. The device as claimed in claim 12, wherein the signal has a format in accordance with a standardized audio interface.

19. The device as claimed in claim 15, wherein the selected pattern is indicative of the number of times the main data which will be recorded will have been recorded.

20. The device as claimed in claim 12, further comprising detection means, coupled to said decision means, for detecting whether the subcode frames include copy bits having logic values which alternate.

21. The device as claimed in claim 16, wherein the original pattern is indicative of the number of time the main data of said signal has been recorded, and selected patterns is indicative of the number of times the main data which will be recorded will have been recorded.

22. The device as claimed in claim 13, wherein said decision means is adapted to produce said disabling control signal when the predetermined pattern indicates that the main data is copy protected.

23. A method for inhibiting recording of a digital information signal on a record carrier, the signal having successive information frames which each include main data and subcode data, the subcode data of the information frames forming consecutive subcode frames, the method comprising:

determining whether the subcode frames include copy bits having logic values which alternate among the subcode frames whereby the copy bits in at least two of the subcode frames have logic values which are different; and inhibiting recording of the signal when the logic values of the copy bits alternate among the subcode frames in accordance with a predetermined pattern.

24. The method as claimed in clam 23, wherein the pattern signifies that the main data is copy protected.

25. A method of recording a digital information signal on a record carrier, the signal having successive information frames which each include main data and subcode data, the subcode data of the information frames forming consecutive subcode frames, the method comprising:

replacing the subcode frames with substitute subcode frames prior to recording the signal on the record carrier, each substitute subcode frame having at least one substitute copy bit; and assigning logic values for the substitute copy bits such that the substitute copy bits have logic values which alternate among the substitute subcode frames in accordance with a selected pattern which is indicative of a particular characteristic of the main data which will be recorded whereby the substitute copy bits in at least two of the substitute subcode frames have logic values which are different.

26. The method as claimed in claim 25, wherein the selected pattern is indicative of the number of times the main data which will be recorded will have been recorded.

27. The method as claimed in claim 25, wherein the copy bits in the subcode frames have logic values which alternate among the subcode frames and form an original pattern, and the selected pattern is selected on the basis of the original pattern.

28. The method as claimed in claim 27, wherein the original pattern is indicative of the number of time the main data of the signal has been recorded, and the selected pattern is indicative of the number of times the main data which will be recorded will have been recorded.

29. The method as claimed in claim 27, wherein the original pattern is periodic, and the logic values for the substitute copy bits are assigned so that the selected pattern is periodic and the ratio of the number of substitute copy bits of a first logic value in a period of the selected pattern to the total number of substitute copy bits in the period of the selected pattern is dependent on the ratio of the number of copy bits of a first logic value in a period of the original pattern to the total number of copy bits in the period of the original pattern.

30. An information recording device for recording a digital information signal supplied thereto on a record carrier, the signal having successive information frames which each include main data and subcode data, the subcode data of the information frames forming consecutive subcode frames, the device comprising:

replacement means for replacing the subcode frames with substitute subcode frames prior to recording the signal on the record carrier, each substitute subcode frame having at least one substitute copy bit; and assignment means, coupled to said replacement means, for assigning logic values for the substitute copy bits such that the substitute copy bits have logic values which alternate among the substitute subcode frames in accordance with a selected pattern which is indicative of a particular characteristic of the main data which will be recorded whereby the substitute copy bits in at least two of the substitute subcode frames have logic values which are different.

31. The device as claimed in claim 30, wherein the selected pattern is indicative of the number of times the main data which will be recorded will have been recorded.

32. The device as claimed in claim 30, wherein the copy bits in the subcode frames have logic values which alternate among the subcode frames and form an original pattern, and the selected pattern is selected by said assignment means on the basis of the original pattern.

33. The device as claimed in claim 32, wherein the original pattern is indicative of the number of time the main data of the signal has been recorded, and the selected pattern is indicative of the number of times the main data which will be recorded will have been recorded.

34. The device as claimed in claim 32, wherein the original pattern is periodic, and said assignment means assigns logic values for the substitute copy bits so that the selected pattern is periodic and the ratio of the number of substitute copy bits of a first logic value in a period of the selected pattern to the total number of substitute copy bits in the period of the selected pattern is dependent on the ratio of the number of copy bits of a first logic value in a period of the original pattern to the total number of copy bits in the period of the original pattern.

* * * * *